United States Patent [19]

Snoeren

[11] Patent Number: 4,857,724
[45] Date of Patent: Aug. 15, 1989

[54] PICTURE PICK-UP AND DISPLAY SYSTEM AND PICTURE PICK-UP DEVICE SUITABLE FOR SAID SYSTEM

[75] Inventor: Rudolph M. Snoeren, Eindhoven, Netherlands

[73] Assignee: U.S. Philips Corp., New York, N.Y.

[21] Appl. No.: 192,810

[22] Filed: May 11, 1988

[30] Foreign Application Priority Data

May 15, 1987 [NL] Netherlands .................. 8701169

[51] Int. Cl.$^4$ ............................................. H01J 31/50
[52] U.S. Cl. ............................... 250/213 VT; 250/216
[58] Field of Search ............ 250/216, 213 R, 213 VT; 358/97, 225; 350/572

[56] References Cited

U.S. PATENT DOCUMENTS 3,715,620  2/1973  Marro ........................... 250/213 VT
4,076,978  2/1978  Brennan et al. ............. 250/213 VT Primary Examiner—David C. Nelms
Attorney, Agent, or Firm—William L. Botjer

[57] ABSTRACT

Between an image intensifier (II) having a circular radiation exit surface (II2) and an image sensor in the form of a solid state sensor (CTD) with a rectangular picture pick-up surface (PP) there is arranged an optical coupling system (OP) for producing an ellipsoidal picture (EL) of the circular radiation exit surface (II2) within or at least partly around the rectangular picture pick-up surface (PP). A signal correction device (GEN, CTD or PROC, respectively) is provided for compensating the adaptation of the optical coupling system, whilst the sensor may form part of said device (GEN, CTD), said compensation being effected by adapting the clock pulse frequency so that the corrected picture signal produces the image in a circular surface (DIS) on a screen (MIS) of a picture display device (MON).

3 Claims, 1 Drawing Sheet

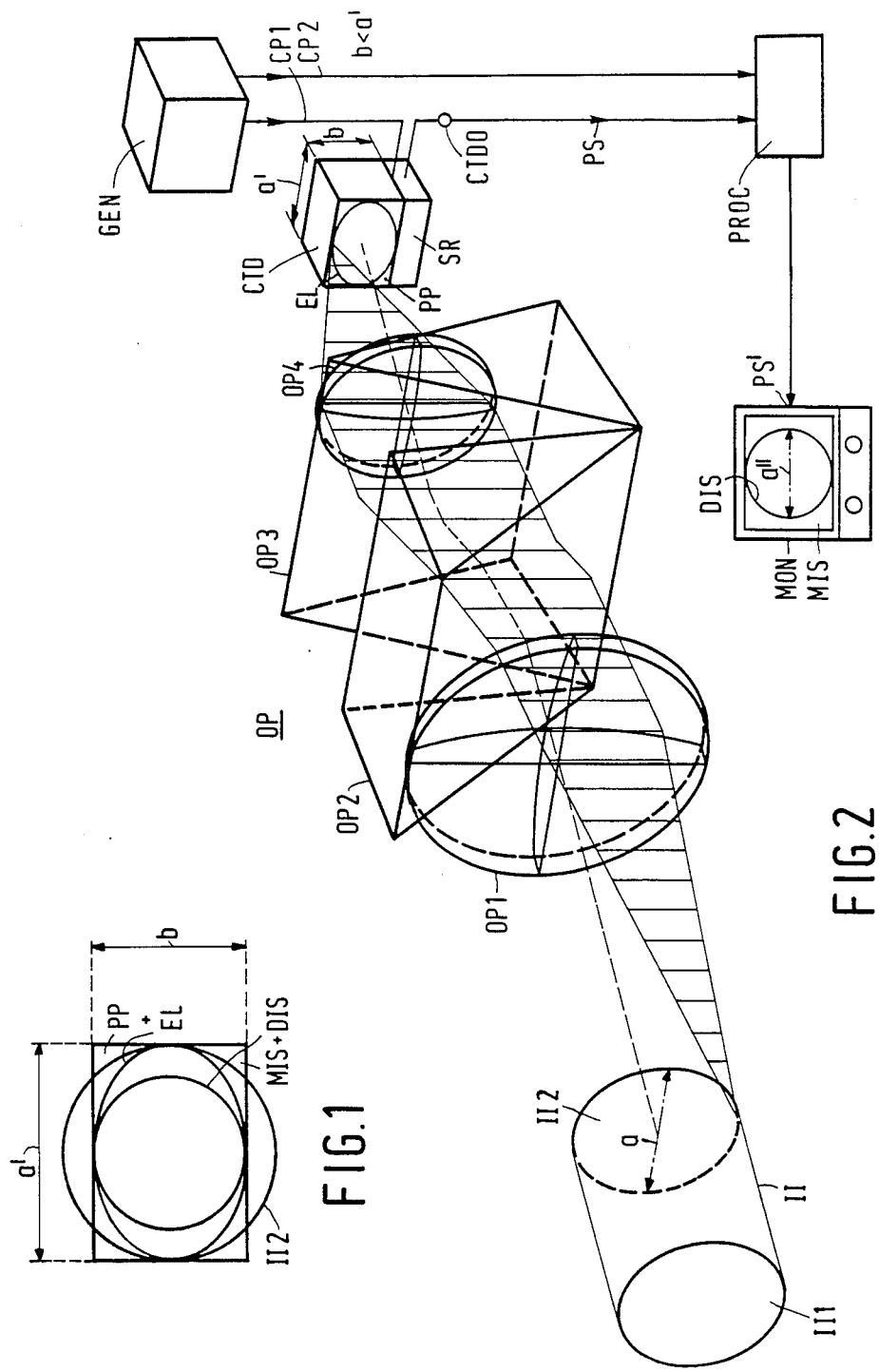

PICTURE PICK-UP AND DISPLAY SYSTEM AND PICTURE PICK-UP DEVICE SUITABLE FOR SAID SYSTEM

BACKGROUND OF THE INVENTION

The invention relates to a picture pick-up and display system comprising an image intensifier for intensifying radiation from a scene to be picked up, for which purpose the image intensifier has a radiation entrance surface and a radiation exit surface, an image sensor for picking up on a picture pick-up surface a picture corresponding to the scene on the radiation exit surface and for supplying a line and field-sequentially generated picture signal corresponding thereto, an optical coupling system arranged between the radiation exit surface of the image intensifier and the picture pick-up surface of the image sensor for adapting the shape of the radiation exit surface to that of the picture pick-up surface, a signal correction device for compensating the adaptation of the optical coupling system by supplying a corrected picture signal, and a display device provided with a display screen for displaying a picture corresponding to the scene whilst applying the corrected picture signal to the display device. The invention also relates to a picture pick-up device suitable for said system.

Such a device including the image intensifier which is, for example, further operative as a radiation converter for converting invisible radiation into visible light as radiation may be used, for example, for X-ray pictures, for observation in the infrared or ultraviolet radiation range etc. The image sensor then operates as an opto-electronic sensor. If the image sensor is sensitive to radiation other than light, the image intensifier/-radiation converted may be constructed to convert any type of radiation into the specific radiation to which the image sensor is sensitive. An image intensifier without radiation conversion can be used when picking up a scene having a light level which is too low for the image sensor.

When picking up pictures, a problem occurs if the shape of the radiation exit surface of the image intensifier is not equal to that of the picture pick-up surface of the image sensor. Surface shapes which are circular, rectangular, square or ellipsoidal are mentioned as examples. The optical coupling system ensures the adaptation of the shape, but the result upon direct display of the picture signal would be the display of a distorted picture. Before the picture is displayed, the distortion is compensated electronically by means of the signal correction device so that a picture corresponding to the scene results on the display screen.

If the image intensifier and the image sensor are both in the form of a vacuum tube, the said problem does not occur or hardly occurs because the radiation exit surface and the picture pick-up surface generally have a circular shape. The problem does occur in the combination of an image intensifier in the form of, for example, a vacuum tube and an image sensor in the form of a solid state sensor, with the image intensifier having a circular radiation exit surface and the sensor often having a rectangular picture pick-up surface. The rectangular shape particularly conforms to the shape of television display screens for the display of the line and field-sequentially formed picture. Examples of the aspect ratio of the rectangular shape are 3 to 4, 3 to 5, 9 to 16, etc. The line and field scanning directions are conventionally in the direction of the length and the width, respectively, of the rectangle.

SUMMARY OF THE INVENTION

It is an object of the invention to realise a picture pick-up and display system ensuring an optimum adaptation of the optical coupling system and an optimum compensating signal correction. To this end a system according to the invention is characterized in that in the case of circularity of the radiation exit surface of the image intensifier and rectangularity of the picture pick-up surface of the image sensor the optical coupling system produces an ellipsoidal image of the circular radiation exit surface within or at least partly around the rectangular picture pick-up surface, the image sensor being a solid state sensor supplying the picture signal from a sensor output under the control of clock pulses for the purpose of applying said signal to the display device, a clock pulse frequency being active in the signal correction device for line-sequentially obtaining the corrected picture signal which, upon display, produces the image in a circular surface on the display screen.

The choice of the circular diameter, or in other words the major axis of the ellipse corresponding to more or less the length of the rectangle and the minor axis of the ellipse corresponding to more or less the width of the rectangle ensures an optimum use of the number of picture pick-up elements in the picture pick-up surface. Lines containing information located in the direction of the major axis upon picking up the picture have a higher resolution in this direction upon display of the circular surface obtained by the correcting signal compression, as compared with the case in which the optical coupling system is absent.

The simplest signal correction is realised in an embodiment of the system which is characterized in that the sensor forms part of the signal correction device and in which the said clock pulse frequency is present at the clock pulses which are active for the line-sequential picture signal supply. A single increase of the clock pulse frequency with respect to the conventional control, in which no optical coupling system for adaptation of the shape is present, is sufficient for the signal correction in the line direction.

To obtain the optimum picture signal correction an embodiment of the picture pick-up and display system according to the invention is characterized in that when using the optical coupling system with a given picture compression factor in the direction of the minor axis of the ellipse, the said clock pulse frequency differs from the clock pulse frequency by a factor which is substantially equal to the inverse picture compression factor if the optical coupling system is absent.

BRIEF DESCRIPTION OF THE DRAWING

The invention will now be described in greater detail by way of example with reference to the accompanying drawings in which FIG. 1 explains the relationship between the optical distortion by an optical coupling system and a compensating picture signal correction and FIG. 2 shows diagrammatically the structure of a picture pick-up and display system according to the invention and particularly that of a picture pick-up device suitable for said system.

DETAILED DESCRIPTION OF THE PREFERRED EMBODIMENT

FIG. 1 shows two circles, an ellipse an a rectangle referenced by symbols which also occur in the picture pick-up and display system of FIG. 2 according to the invention. In FIG. 1 the reference II2 denotes a circle having the largest diameter, which circle is associated with a circular radiation exit surface II2 of an image intensifier II of FIG. 2 and which has also a radiation entrance surface II1. According to FIG. 2 the diameter of the radiation exit surface II2 has a length a. The radiation exit surface II2 is imaged via an optical coupling system OP on a picture pick-up surface PP of an image sensor CTD in the form of a solid state sensor having the same reference symbol. The optical coupling system OP is shown diagrammatically with a lens OP1 representing a collimator lens system, with two prisms OP2 and OP3 which together constitute an anamorphotic system and with a lens OP4 representing a camera lens system. To illustrate the operation of the optical coupling system OP, solid lines represent an optical path between a corresponding point on the surfaces II2 and PP. Furthermore the optical axis of the optical coupling system OP is shown between the surfaces II2 and PP. The picture pick-up surface PP of the sensor CTD of FIG. 2 is also denoted by PP in FIG. 1. The Figures show that the surface PP has a rectangular shape with a long side having a length of a' and a short side having a length of b. In this case it holds that b is smaller than a' (b<a'). Examples of the aspect ratio of the rectangle, the ratio of b to a', are 3 to 4 (as shown in FIG. 1) 3 to 5, 9 to 16, etc. It is assumed that in the absence of the optical coupling system OP shown, that is to say, in the presence of a conventional camera lens system, the radiation exit surface II2 has a circular image on the picture pick-up surface PP as is shown in FIG. 1. However, by using the optical coupling system OP an ellipsoidal image of the surface II2 of FIG. 2 is obtained which is denoted by EL. The ellipse EL of FIG. 1 is shown just within the rectangular picture pick-up surface PP. The reference symbols PP+EL in FIG. 1 emphasize that the surface PP and the ellipse EL are associated. FIG. 1 shows that the optical coupling system OP has a picture compression factor of b/a' in the direction of the minor axis of the ellipse, with the major axis (a') corresponding to the circle diameter (a) of the circular surface II2 of FIG. 2.

FIG. 2 shows that the sensor CTD has a picture signal sensor output denoted by CTD for the supply of a picture signal PS. This supply is effected under the control of clock pulses CP1 from a clock pulse generator GEN which, for example, supplies further clock pulses CP2 to a signal processing circuit PROC to which also the picture signal PS is applied. The circuit PROC may be formed in a manner to be described hereinafter with a signal memory circuit, signal correction circuits, signal amplifier circuits, etc. The circuit PROC applies the processed signal PS as a signal PS' to an input of a display device MON with a display screen MIS. The device MON is, for example, a television monitor.

The display screen MIS of the device MON of FIG. 2 is identically indicated in FIG. 1. If the signal PS' associated with the ellipse EL were to be displayed without further measures, this ellipse would be displayed on the screen MIS in the manner shown in FIG. 1. The result would be a distorted image of a scene picked up via the image intensifier II of FIG. 2, because the circular shapes have merged into ellipsoidal shapes. A compensating signal correction to counteract this distortion is performed in a manner to be described hereinafter, more specifically by converting the ellipse EL into a circle denoted by DIS. The circle DIS of FIG. 1 is produced because an electronic signal compression (from EL to DIS) with the same compression factor is performed after the optical picture compression (from II2 to EL). The reference symbols MIS+DIS in FIG. 1 emphasize that the screen surface MIS and the circular surface DIS are associated. In FIG. 2 the circular surface DIS is shown on the display screen MIS with a circle diameter length a" corresponding to the circle diameter length a of the radiation exit surface II2.

In addition to the information processing operation according to the invention via the ellipse shape EL, FIG. 1 illustrates two other possible information processing operations with their inherent drawbacks. The direct image of the surface II2 on the picture pick-up surface PP results in the information in the segments of the circle outside the rectangle being lost. The reduced image of the surface II2, in the shape of the circular surface DIS, on the picture pick-up surface PP leads to a situation in which the section of the pick-up surface between the circle DIS and the sides of the rectangle no longer contributes to the information processing operation. The ellipse shape EL provides the optimum compromise, making optimum use of the number of picture pick-up elements in the picture pick-up surface PP. The compensating signal compression (from EL to DIS) results in a higher resolution in the direction of the major axis. FIG. 1 shows that the ellipse EL is tangential to the sides of the rectangle. Instead, the ellipse may extend beyond the rectangle in, for example both axis directions so that on the one hand more picture pick-up elements contribute to the information processing operation, but on the other hand sections of the scene picked up are lost. Dependent on the desired information processing operation, it generally holds that the ellipse is located within or at least partly around the rectangle.

For the components shown in FIG. 2 the signal correction device for compensating the adaptation of the optical coupling system can be indicated by (GEN, CTD or PROC, respectively). The simplest signal correction can be realised with a device (GEN, CTD) if the sensor CTD forms part of it. A single increase of the clock pulse frequency with respect to the conventional control, for which no optical coupling system OP is present to adapt the shape, is sufficient for the signal correction in the line direction. For explanatory purposes FIG. 2 shows a simple design of the sensor CTD, more specifically as a charge transfer device. The sensor CTD comprises the picture pick-up surface P and contiguous thereto a parallel-in, series-out shift register SR. It is assumed that after an information-integration period, in which, for example, light radiation is incident on the picture pick-up surface PP, an image of a scene in the form of charge packets is present in picture pick-up elements arranged in rows and columns. After the information-integration period there is a parallel transfer per line period in the column direction between the element rows and to the shift register SR during an information transfer period. The parallel transfers are effected in, for example, line-blanking periods as occur in television. In the remaining part of the line periods a series-sequential shift is effected in the shift register SR so that the picture signal PS thus generated line and field-sequentially occurs at the sensor output CTDO. For the sake of simplicity it is assumed that during the information-transfer period there is no information integration at the elements of the picture pick-up surface PP, because this would introduce a signal smear effect. Furthermore it is assumed that the picture signal PS generated during the information-transfer period is stored in a signal memory which is present in the signal processing circuit PROC and is periodically derived therefrom in the conventional manner so as to be applied to the device MON operating as a television monitor. At a line period of, for example, 64/μs there is a line blanking period of 12/μs and a line scanning period of 52/μs in which the picture information is present.

The shift register SR is usually controlled by means of clock pulses during the period of 52/μs at a given clock pulse frequency which is dependent on the number of register elements so as to achieve that during this period all register elements have given their information contribution to the picture signal PS. If such a control were to be effected when using the optical coupling system OP, a distorted picture would result upon display due to the conversion from circle to ellipse. The compensating signal compression is obtained by choosing the clock pulse frequency to be different from the normal clock pulse frequency by a factor which is substantially equal to the inverse picture compression factor in a picture pick-up device (II, OP, CTD, GEN) according to the invention. Starting from the picture compression factor shown, which is equal to ¾, the clock pulse frequency increased to 4/3 leads to an information period of ¾ times 52, which is 39/μs. Subsequently the elements of the shift register SR are without picture information during the remaining period of 13/μs. The result is that the ellipse EL of FIG. 1 is imaged on the screen MIS as a circle tangential to the left edge of the screen MIS of the device MON of FIG. 2. By controlling the shift register SR with the increased clock pulse frequency after 12+6.5=18.5 us instead of after 12/μs from the start of the line period of 64/μs, the circle DIS obtained by compression is imaged in the centre of the screen MIS, as is shown in FIG. 2.

A single scene recording has been described, which by repeated reading from a signal memory in the circuit PROC conventionally leads to a television display. Instead of the compensating signal compression being realised in the manner described in the sensor CTD, it is possible to utilise the signal memory for this purpose and to this end the frequency of the clock pulses CP2 for the memory signal supply is increased by the inverse picture compression factor with respect to the conventional clock pulse frequency. In this case there is a picture pick-up device (II, OP, CTD, GEN, PROC) according to the invention.

If the circuit PROC does not include a signal memory and the sensor CTD is suitable for television recording, it is of greater importance for the sensor CTD to form part of the signal correction device (GEN, CTD). The sensor CTD in the form of a charge coupled device may then be in the form of a frame transfer device. In this case a storage member which is shielded from incident light radiation is present between the picture pick-up surface PP and the shift register MR. After a light-integration period per field period the information is shifted on to the storage member during, for example seven line periods falling within the field blanking period, from which member the parallel-in, series-out shift register is filled with information per line period during the line blanking period and subsequently the information becomes series-sequentially available at the sensor output during the line scanning period. In the sensor design described the compensating picture signal compression can be directly performed in the manner already described with reference to register SR.

The optical coupling system OP is shown with the anamorphotic system (OP2, OP3) formed with prisms OP2 and OP3. Instead, an optical coupling system design with fibres can be used. A fibre system with a circular radiation entrance surface and an ellipsoidal radiation exit surface could then be contiguously present between the surface II2 and PP.

The image intensifier II may also operate as a radiation converter. A radiation conversion is required dependent on the sensitivity of the sensor CTD to types of radiation. In the case of television observation of infrared images and sensitivity to visible light at the sensor CTD, the radiation will be converted at the image intensifier II and the sensor CTD will operate as a television camera. In the case of X-ray exposure of an object as a scene to be picked up, a radiation conversion is also effected and the sensor CTD is, for example, operative for picking up a single interlaced or non-interlaced image or a series of single images.

I claim:

1. A picture pick-up and display system comprising an image intensifier for intensifying radiation from a scene to be picked up, for which purpose the image intensifier has a radiation entrance surface and a radiation exit surface, an image sensor for picking up on a picture pick-up surface a picture corresponding to the scene on the radiation exit surface and for supplying a line and field-sequentially generated picture signal corresponding thereto, an optical coupling system arranged between the radiation exit surface of the image intensifier and the picture pick-up surface of the image sensor for adapting the shape of the radiation exit surface to that of the picture pick-up surface, a signal correction device for compensating the adaptation of the optical coupling system by supplying a corrected picture signal, and a display device provided with a display screen for displaying a picture corresponding to the scene whilst applying the corrected picture signal to the display device, characterized in that in the case of circularity of the radiation exit surface of the image intensifier and rectangularity of the picture pick-up surface of the image sensor the optical coupling system produces an ellipsoidal image of the circular radiation exit surface within or at least partly around the rectangular picture pick-up surface, the image sensor being a solid state sensor supplying the picture signal from a sensor output under the control of clock pulses for the purpose of applying said signal to the display device, a clock pulse frequency being active in the signal correction device for line-sequentially obtaining the correct picture signal which, upon display, produces the image in a circular surface on the display screen.

2. A picture pick-up and display system as claimed in claim 1, characterized in that the sensor forms part of the signal correction device and in which the said clock pulse frequency is present at the clock pulses which are active for the line-sequential picture signal supply.

3. A picture pick-up and display system as claimed in claim 1, characterized in that when using the optical coupling system with a given picture compression factor in the direction of the minor axis of the ellipse, the said clock pulse frequency differs from the clock pulse frequency by a factor which is substantially equal to the inverse picture compression factor if the optical coupling system is absent.

* * * * *